United States Patent
Tomich et al.

(10) Patent No.: US 7,808,984 B2
(45) Date of Patent: *Oct. 5, 2010

(54) PHOTONIC HOME AREA NETWORK

(75) Inventors: John L. Tomich, Coppell, TX (US);
Michael J. Vonahnen, Dallas, TX (US);
Michael B. Sheehan, Prosper, TX (US)

(73) Assignee: Throughput Holdings, Inc., Coppell, TX (US)

(*) Notice: Subject to any disclaimer, the term of this patent is extended or adjusted under 35 U.S.C. 154(b) by 925 days.

This patent is subject to a terminal disclaimer.

(21) Appl. No.: 11/483,713

(22) Filed: Jul. 10, 2006

(65) Prior Publication Data

US 2006/0274677 A1    Dec. 7, 2006

Related U.S. Application Data

(63) Continuation of application No. 09/435,657, filed on Nov. 8, 1999, now Pat. No. 7,099,316, which is a continuation-in-part of application No. 08/607,964, filed on Feb. 29, 1996, now Pat. No. 5,983,068.

(51) Int. Cl.
*H04L 12/28* (2006.01)
*H04L 12/56* (2006.01)

(52) U.S. Cl. ............................................ 370/389

(58) Field of Classification Search ............ 370/389, 370/338, 258, 328, 352, 254, 410, 532, 540, 370/392, 358, 400, 401, 351, 395, 353; 398/45, 398/49, 58, 1, 79, 59; 709/249, 201; 385/15, 385/16; 725/32, 35, 78, 105, 82, 62; 455/517, 455/509; 375/240; 379/388, 391, 390, 392; 700/278

See application file for complete search history.

(56) References Cited

U.S. PATENT DOCUMENTS 3,751,670 A    8/1973    Grodner et al.

(Continued)

*Primary Examiner*—Pankaj Kumar
*Assistant Examiner*—Prenell P Jones
(74) *Attorney, Agent, or Firm*—Howison & Arnott, L.L.P.

(57) ABSTRACT

An apparatus for a service node used in a multimedia network. The apparatus has a data distributor circuit, and a decoder. The data distributor card has a data port for coupling with a data stream. The data distributor circuit has a relational code for determining whether an address field of a data packet of the data stream is intended for local distribution to peripheral devices by the distribution circuit. The decoder, in communication with the distribution circuit, has a virtual channel filter for filtering the address field to route the data packet to at least one data port, such as that associated with a peripheral device. An incorporator circuit is provided that is electrically-coupled to the data port to insert an address value having a relational code and a virtual channel code in a data input from the at least one data port. The incorporator then inserts the data input from the at leas tone data port into the data stream. In a method of the invention, interfacing a multimedia communications data stream having a plurality of data packets is provided. Inputting a data packet of the data stream, determining whether an address field of the data packet is intended for local distribution, and routing the data packet to a data port if the data packet is intended for local distribution. Otherwise, the data packet is returned to the data stream if the data packet is not intended for local distribution.

12 Claims, 6 Drawing Sheets

U.S. PATENT DOCUMENTS

| | | | |
|---|---|---|---|
| 4,183,054 A | 1/1980 | Patisaul et al. | |
| 4,533,247 A | 8/1985 | Epworth | |
| 4,621,282 A | 11/1986 | Ahem | |
| 4,627,106 A | 12/1986 | Drake | |
| 4,662,004 A | 4/1987 | Fredriksen et al. | |
| 4,742,475 A * | 5/1988 | Kaiser et al. | 700/278 |
| 4,748,689 A | 5/1988 | Mohr | |
| 5,113,403 A | 5/1992 | Block et al. | |
| 5,144,619 A * | 9/1992 | Munter | 370/353 |
| 5,218,356 A | 6/1993 | Knapp | |
| 5,274,641 A * | 12/1993 | Shobatake et al. | 370/392 |
| 5,276,679 A * | 1/1994 | McKay et al. | 370/358 |
| 5,528,594 A | 6/1996 | Butter et al. | |
| 5,539,880 A | 7/1996 | Lakhani | |
| 5,742,840 A * | 4/1998 | Hansen et al. | 712/210 |
| 5,768,539 A * | 6/1998 | Metz et al. | 709/249 |
| 5,812,930 A * | 9/1998 | Zavrel | 725/62 |
| 5,847,771 A * | 12/1998 | Cloutier et al. | 348/564 |
| 5,983,068 A * | 11/1999 | Tomich et al. | 725/32 |
| 6,005,861 A * | 12/1999 | Humpleman | 370/352 |
| 6,049,823 A | 4/2000 | Hwang | |
| 6,078,596 A * | 6/2000 | Wellbrock | 370/352 |
| 6,091,775 A * | 7/2000 | Hibi et al. | 375/240.11 |
| 6,202,082 B1 * | 3/2001 | Tomizawa et al. | 709/201 |
| 6,202,211 B1 * | 3/2001 | Williams, Jr. | 725/78 |
| 6,405,049 B2 * | 6/2002 | Herrod et al. | 455/517 |
| 6,684,030 B1 * | 1/2004 | Taylor et al. | 398/59 |
| 7,099,316 B1 * | 8/2006 | Tomich et al. | 370/389 |

\* cited by examiner

| NODE STATION 140 | TYPE DEVICE 141 | DEVICES 142 | SUB ROUTINE 143 | SPECIAL INSTRUCTIONS 144 |
|---|---|---|---|---|
| | A. TELEPHONE | 1. TELEPHONE #1 | PHONE NUMBER | |
| | | 2. TELEPHONE #2 | PHONE NUMBER | |
| | | 3. TELEPHONE #3 | PHONE NUMBER | |
| | B. PERSONAL COMPUTER | 1. PC #1 | PHONE NUMBER | |
| | | 2. PC #2 | PHONE NUMBER | |
| | | 3. LAP TOP DOCK | OUTGOING ONLY | |
| | C. AUXILLARY | 1. FIRE ALARM | | NOTIFY FIRE DEPT |
| | | 2. BURGULARY ALARM | | NOTIFY POLICE DEPT |
| | | 3. MEDICAL DATA | | SPECIAL INSTRUCTIONS |
| | | 4. SPECIAL FUNCTION | | TBD |
| | D. FAX MACHINE | 1. FAX #1 | PHONE NUMBER | |
| | E. VIDEO CONFERENCING | 1. VIDEO CONF #1 | PHONE NUMBER | |
| | F. TELEVISION | 1. TELEVISION #1 | | |
| | | 2. TELEVISION #2 | | |
| | | 3. TELEVISION #3 | | |

*FIG. 5*

PHOTONIC HOME AREA NETWORK

RELATED APPLICATION

The present patent application is a continuation of and claims priority from U.S. patent application Ser. No. 09/435,657, entitled PHOTONIC HOME AREA NETWORK filed Nov. 8, 1999 now U.S. Pat. No. 7,099,316, which is a continuation-in-part of and claims priority from U.S. patent application Ser. No. 08/607,964, now U.S. Pat. No. 5,983,068, entitled PHOTONIC HOME AREA NET WORK filed Feb. 29, 1996, each of which is incorporated by reference herein in its entirety.

TECHNICAL FIELD

The present invention relates to a device for bi-directional routing of data for a plurality of dissimilar electronic devices, and in particular, to data routing for a plurality of dissimilar electronic devices from a common data path.

BACKGROUND OF THE INVENTION

Individuals are periodically charged expensive fees to have television, telephone, Internet, or other communications services provided to their homes. If these individuals could be formed into a network group, then the resulting economic leverage of these networked individuals create a better negotiation position for reducing the charges of these services. That is, an organization representing five-hundred or more service subscribers has more negotiating leverage than one subscriber.

As a result, the network community would have the prerogative of selecting television channels that are consistent with the religious, moral and ethical standards of the community. But if individual subscribers in the community insist on channels that may be offensive to the community, these channels can be encoded for the specific purchaser and the cost of service charged directly to the user. However, available neighborhood network technology has insufficient bandwidth to accommodate all the data associated with television, telephone and other communications services, making a neighborhood network impractical and expensive. Furthermore, such network systems do not accommodate varying data formats such as synchronous transmissions typical of television transmissions, and asynchronous transmission typical of computer data transmissions. For example, present network broadcasts of video are generally limited to uni-directional distribution U.S. Pat. No. 4,183,054 issued to Patisaul et al, discloses a digital communication technique for a television communication system. The television channels are obtained and multiplexed, then transmitted through an LED to generate an encoded optical signal. The encoded signal is received by a photodetector which converts the optical signals into electrical signals. The signal is then demultiplexed into individual channels. A problem with such a device is that it is limited to distributing data and does not allow the addition of data by users. A further problem is that data is limited to synchronous transmissions.

Another dilemma that has been brought about due to the diversity of service providers is in the offices and apartment markets. Generally, these developments in old and new have become a target for the telecom companies. Upstart companies have been denied access to potential customers in these markets because landlords have existing service arrangements with the regional Bell companies.

Further, building owners do not desire dozens of start-up companies traipsing onto their properties. Should they be compelled to do so by regulators, the property owners consider this to fall nothing short of "forced entry."

Such disputes have been coming before the Federal Communications Commission, which is hearing out both sides to decide whether to forbid building owners from turning away telecom providers. At stake is the ability to reach millions of customers in the nation's estimated 750,000 office buildings, and the one-third of the population who live in apartments.

The upstarts, known as competitive local-exchange carriers or CLECs, complain that competition is inhibited without their access inside the buildings. The need exists for these upstarts to wind wires through walls, tap into existing wiring or switches, or install antennae on roofs. Commonly, the upstarts' requests to enter buildings are often turned down, and even when allowed to come in, the negotiation process is prolonged or landlords demand excessive fees.

On the other hand, allowing access to the building is burdensome to the building owner. It has not been practical to allow access in view that, in Florida for example, there are over 250 suppliers, which would wreak havoc if there was a building with over 400 renters.

Attempts have been made to provide a data communications network infrastructure for allowing ready access by multiple service providers. An example has been with SONET, which requires optical signals travelling across the network to be converted into electrical signals at each network transit point, and then re-converted into optical signals for transport to the next transit point. The multiple conversions required in a SONET/SDH network increase network complexity and cost.

But SONET/SDH has been cumbersome. In the public network transmission infrastructure, the ability to manage data has resided in the SONET/SDH equipment that converts the data traffic from an electrical signal to an optical signal, which is then transmitted over an optical fiber. The optical fiber itself is only a physical transmission medium with no imbedded intelligence. As a result, moving data through the network involves the complex processes that add cost and make scaling difficult.

The SONET/SDH architecture has typically required a linear or ring-based network topology. The SONET/SDH architecture was originally designed to transport voice traffic, which contains far less data than present high-speed data services. Unlike voice traffic, which is generally characterized by slow growth and stable demand, rapid growth and unpredictable demand characterize data traffic. Data networks must be capable of being deployed cost-effectively and expanded rapidly.

But the SONET/SDH network architecture has not been sufficiently flexible to meet present data requirements. Generally expanding the capacity of a SONET/SDH network is time-consuming and requires significant capital investment by the service provider. There have been only two methods to expand a SONET/SDH network. The first option has been to increase the speed at which the network operates. Because SONET/SDH equipment was designed to operate at a specific speed, this option has required that all equipment on the SONET/SDH ring be replaced with higher speed devices on a concurrent basis. Accordingly, adding capacity to a SONET/SDH ring network has been a complex and time-consuming process.

The second option to expand a SONET/SDH ring network has been to construct new rings with new fiber or increase the capacity of each individual fiber on a ring through the utilization of DWDM technology, which can transform each fiber strand into as many as 100 parallel optical wavelengths. Under either approach, network complexity increases since each optical wavelength must be terminated by SONET/SDH equipment and the interconnection of multiple SONET/SDH rings will absorb some available network capacity Thus, a need exists for products that are based on a common architecture that can accelerate the release of new products, and enable customers to upgrade their networks without significant new capital equipment or intrusion into the existing structures.

SUMMARY OF THE INVENTION

Accordingly, provided is an apparatus for a service node used in a multimedia network. The apparatus has a data distributor circuit, and a decoder. The data distributor card has a data port for coupling with a data stream. The data distributor circuit has a relational code for determining whether an address field of a data packet of the data stream is intended for local distribution to peripheral devices by the distribution circuit. The decoder, in communication with the distribution circuit, has a virtual channel filter for filtering the address field to route the data packet to at least one data port, such as that associated with a peripheral device.

In a further aspect of the invention, an incorporator circuit is provided that is electrically-coupled to the data port to insert an address value having a relational code and a virtual channel code in a data input from the at least one data port. The incorporator then inserts the data input from the at leas tone data port into the data stream.

In a yet another aspect of the invention, a method of interfacing multimedia communications data stream having a plurality of data packets is provided. The method comprises inputting a data packet of the data stream, determining whether an address field of the data packet is intended for local distribution, and routing the data packet to a data port if the data packet is intended for local distribution. Otherwise, the data packet is returned to the data stream if the data packet is not intended for local distribution.

DESCRIPTION OF THE DRAWINGS

Drawings of a preferred embodiment of the invention are annexed hereto, so that the invention may be better and more fully understood, in which:

FIG. 5 is an illustration of a software subscription table;

DESCRIPTION OF THE PREFERRED EMBODIMENT

Figure 1:
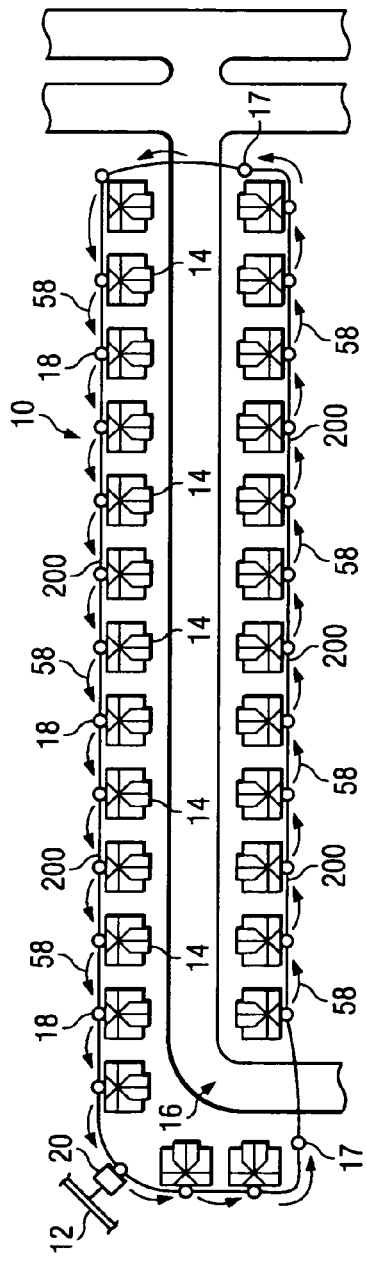
FIG. 1 is an illustration of a local area network set in a neighborhood network.

The present inventions will be described by referring to drawings showing and describing examples of how the inventions can be made and used. In these drawings the same reference characters are used throughout the several views to indicate like or corresponding parts.

Referring to FIG. 1, shown is a photonic home area network ("HAN") generally designated with the numeral 10. The photonic HAN 10 distributes an external communications data network 12 having a plurality of asynchronous and synchronous user data bandwidth segments or channels. These channels contain television programming data, audio programming data and telephony service data from backhaul service providers or world wide communications networks. The photonic HAN has a plurality of node stations 18 and a head-end communications circuit 20 arranged in a ring network. The data network 12 is distributed to a plurality of residential buildings 14 in a residential neighborhood 16 through a multiplexed data signal path 58. It should be understood that the multiplexed data signal path 58 refers to a signal which contains the data provided by the communications data network 12 and that the signal path 58 can be either in a photonic infrared ("IR") form or a radio frequency ("RF") form. Preferably the signal path 58 is in photonic IR form due to low distortion characteristics. It should be noted that in an office environment, a work station having, for example, computer data communications and phone service, can serve as a node station 18.

The photonic HAN 10 provides a time multiplexed two-way communications service at optical frequencies. Optical frequencies provide wide signal bandwidths greater than or equal to 1 GHz. Such bandwidth capacity, for example, allows distribution of at least two-hundred television channels to residential buildings 14 in the HAN 10. The bandwidth simultaneously allows telephony and personal computer transmissions, compressed video conferencing and other data transmission from the residential buildings 14 to the data network 12. An intelligent head-end station 20 can "accumulate" outbound data from the homes delivered through signal path 58. The head-end station 20 delivers the accumulated outbound data in a cost effective manner in wide-bandwidth asynchronous transmission mode ("ATM") and synchronous transmission mode formats. Use of these formats create a flexible interconnect of the HAN with the data network 12 by allowing variable transmission bandwidth rate structures. The HAN system is composed of a plurality of node stations 18 and the head-end communications circuit 20 arranged in a ring network. The digital time division multiplexed ("TDM") data signal path 58 is distributed to a plurality of buildings 14 throughout the neighborhood 16 using an infrared ("IR") transmission medium between node stations 18. Where necessary, passive repeaters 17 can be positioned in the HAN 10 to complete a circuit or multiple optical transmitter and receivers can be included at a node station 18 for crossing signal paths.

The intelligent head-end station 20 can accommodate incoming data from the various data networks 12. The incoming data is time multiplexed data on the digital transmission carrier and modulated onto the optical signal path 58. Neighborhood selectable TV signals are selected from various optional network sources shown in FIG. 6, such as: free space local transmissions, cable company signals 108, and direct space TV sources 102 (Ka Band) and 104 (C and S Band). Neighborhood incoming data flow includes incoming telephony 110 from the local public service telephone network (PSTN), local cellular providers, local Personal Communications Service Providers ("PCS") Networks or specialized service providers, including data transmissions from various telephony, backhaul or direct space network sources 106.

Figure 2:
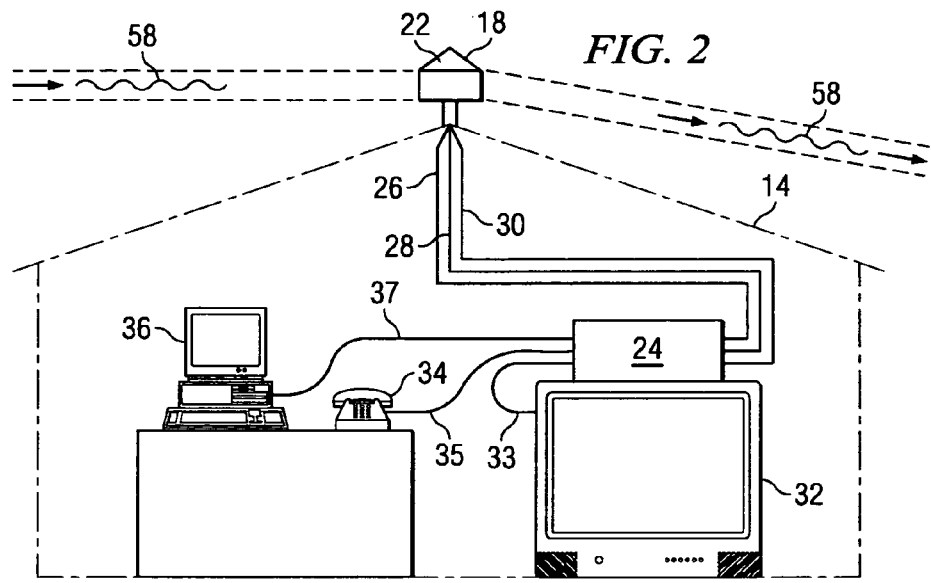
FIG. 2 is an illustration of a node station placed at a node and interfaced with a data path.

Referring to FIG. 2, a node station 18 placed on a residential building 14 is shown. The node station 18 has a roof-top unit 22 connected to a set-top box circuit 24 connected through a receive wire 26, a transmit wire 28 and a low-voltage power wire 30. A suitable wire is a coaxial cable having suitable radio frequency transmission characteristics. An example of such a coaxial cable is RG-75. The roof-top unit 22 transmits and receives multiplexed digital data signal path 58 in an IR signal carrier. The signals are converted into a digital TDM signal and delivered to the set-top box circuit 24 through the receive wire 26. The set-top box circuit 24 can interface with a television 32, a telephone 34 and a personal computer 36 through interface cables 33, 35 and 37, accordingly.

Figure 3:
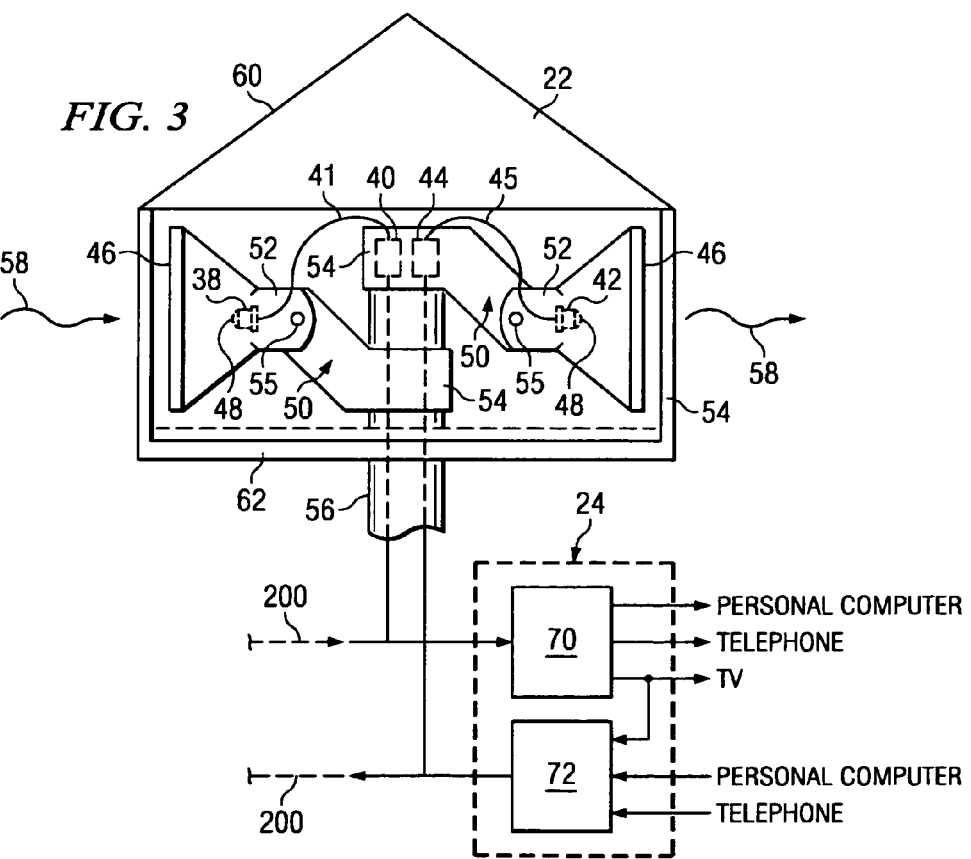
FIG. 3 is a detailed illustration of a node station with transmit optical lasers and receive detectors connected to a set-top box circuit.

In another aspect of the invention shown in FIGS. 1 and 3, fiber optic cable 200 can be used to complete a direct-transmission connection between set-top boxes 24 to replace the roof-top units 22. Such fiber optic cables can be either single-mode or multi-mode depending on the transmission media. The photonic waveform can be generated in the set-top box 24 by installing a laser diode and photonic detector in this enclosure for signal transmission over the fiber optic cable 200. Otherwise, the set-top box electrical components, described later in detail, remain the same. Referring to FIG. 3, a node station 18 is shown in detail. The roof-top unit 22 forms a photonic free space interface using a photonic signal path 58 between the other node stations 18 shown in FIG. 1 for a high-speed digital network. The roof-top unit 22 has a receive optical detector 38 connected to a downlink power amplifier circuit 40 through a coaxial cable 41. A transmit optical laser 42 is connected to an uplink power amplifier circuit 44 through a coaxial cable 45. Multiplexed data path signals are transmitted and received in optical wavelength format by the transmit optical laser 42 and the receive optical detector 38, respectively. The uplink and downlink amplifier circuits 40 and 44, respectively, compensate for conversion losses and optical coupling losses. Conversion losses are generated by converting the optical signals into an electrical form and vice versa which can be from about 20 dB to about 30 dB. The coupling losses are generated by imprecise alignment of the node stations 18 which can be as high as 10 dB.

Transmit laser 42 and receive optical detector 38 are mounted to a large diameter collimation Fresnel lens or reflector 46 to create a low power density photonic radiation pattern which is less susceptible to propagation and vibration disturbances. A suitable Fresnel lens is available from Edmund Scientific Company, New Jersey under the part number E43,011.

Focusing lens 48 is mounted on detector 38 and laser 42 to improve the angular radiation pattern match of detector 38 and laser 42 with the large diameter collimation Fresnel lens 46. Fresnel lens 46 provides a wide-beam diameter pattern for greater optical misalignment robustness and is less susceptible to propagation disturbances caused by, for example, insects or tree leaves crossing data path 58. Collimation lens 46 generates a photonic beam having a diameter of about three-inches which has the additional benefit of aligning the station nodes 18 when installing the HAN.

Reflectors 46 are connected to azimuthal- and elevational-beam pointing adjustments 50. The adjustments 50 have a reflector member 52 and a bracket member 54 pivotally connected through a bolt 55. The adjustments allow adjustment of the plurality of node stations 18, shown in FIG. 1, to establish a photonic ring network. Adjustments 50 are mounted around a column 56 and secured in place by tightening bolt 55.

Surrounding and enclosing the optical detector 38 and laser 42 is an optical window 54 having a bottom edge and a top edge. The optical window is transparent to operational photonic wavelengths. The optical window 54 prevents the buildup of snow and ice and also protects the internal optical detector 38 and laser 42 and amplifiers 40 and 44 from rain, dust or other such foreign objects. On top of the optical window 54 is a roof-top enclosure 60 to prevent the buildup of snow or dust on the optics of the transmit and receiver devices. The bottom plate 62 of the roof-top unit 22 completes the enclosure of the optical laser and detector devices.

Figure 4:
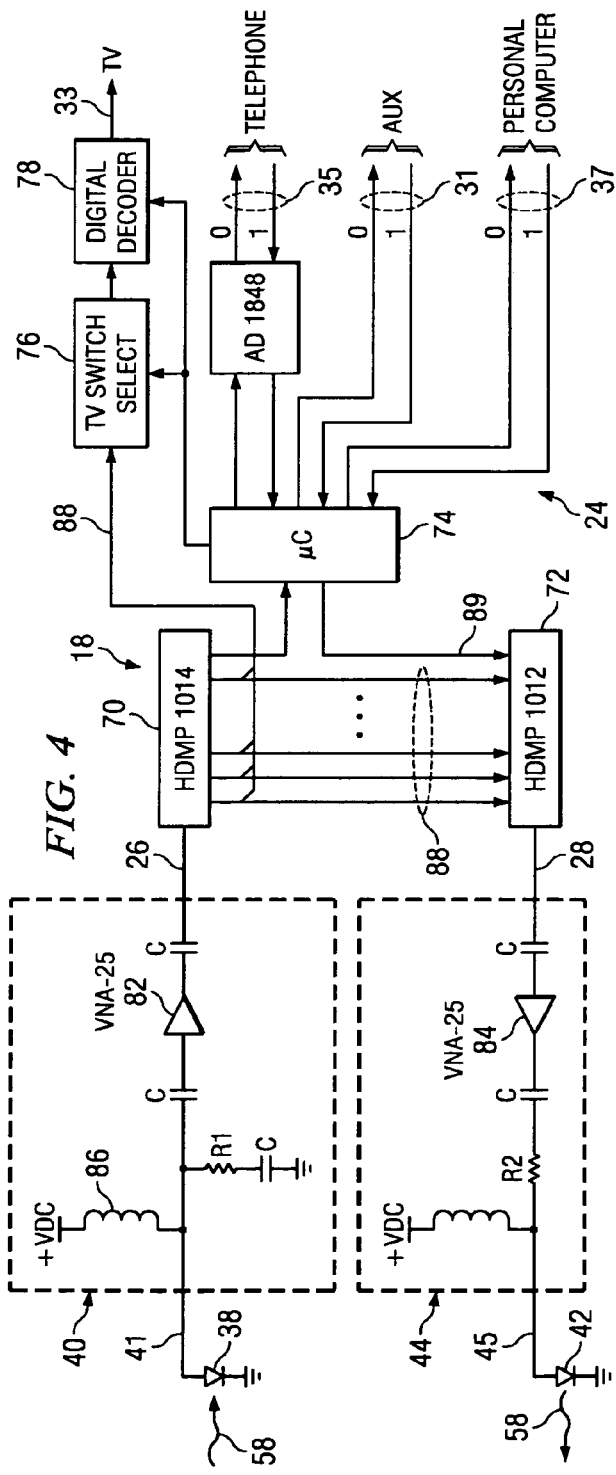
FIG. 4 is a schematic of a set-top box circuit.

Referring to FIG. 4, a schematic illustration of node station 18 is shown. The set-top box circuit 24 has a demultiplexer 70, a multiplexer 72, and a microcontroller 74 which has an on-board electronic memory. The set-top box circuit 24 converts the digital multiplexed data signal 58 into a demultiplexed signal having a set of user data bandwidth segments and common one-way data segments which constitutes the television data segments. The television data segments, consisting of over about 100 to about 200 television channels, are transmitted to the home and then re-transmitted to the next home and so on until the TV signal format returns to the head-end equipment 20 where it is disregarded.

After demultiplexing the television signals in the home set-top box demultiplexer circuit 70, the television signals are sent through a switch/demultiplexer assembly 88 for in home use of the television signals while the identical signal is forwarded by the switched/demultiplexer assembly 88 to multiplexer 72 to be recombined in a multiplexed format, such as time division multiplexed ("TDM") or frequency domain multiplexed ("FDM") and retransmitted to the next home or node.

A particular channel output of the switch/demux assembly 76 is selected by a home remote tuning selector furnished with the set-top box 24. The television channels selected through the remote are passed to the digital decoder 78. If the television channel program is not in the standard distribution category that is distributed free of charge to all subscriber homes, such as premium viewing programs, the data of the television channel is decoded for viewing by the user. Special program or premium program content channels must have a digital code resident in the electronic memory of the set-top microcontroller memory 74 for distribution to that residence. Encoding algorithms are generated in the head-end equipment microcontroller 126 and are passed to each subscriber set-top box having authorized access to the premium channel. This encoding is automated with an update rate which is programmable by the user organization at the head-end station 20. After passing through the decoder the premium channel signal is displayed on the home television 32. Uncoded TV channels are not affected by the decoder 78.

The user data segment of the demultiplexed spectrum 89 contains a plurality of video, audio and telephony information designated for different homes in the LAN 10 community. The user data segments have home codes attached that allows the microcontroller to distinguish which data is addressed for the particular home it resides in. Data addressed to the particular home is interpreted by the set-top box microcontroller 74 and distributed to the applicable output port 31, 37 or 35. Set-top boxes could be configured for multiple telephone, fax, personal computer or auxiliary lines, as necessary. Analog-to-digital ("A/D") and digital-to-analog ("D/A") conversion devices 80 are resident in the set-top box for connection to analog equipment still in service in the home. Digital waveforms can interface directly with digital equipment.

Demultiplexer 70 and multiplexer 72 are high speed integrated circuits capable of at least a 1.5 Giga-bits-per-second data rate time-division multiplexing. A suitable demultiplexer is a HDMP1014 and a suitable multiplexer is a HDMP1012, both available from Hewlett-Packard. The demultiplexer 70 separates the high speed serial data link from the receiver wire 26 into low-speed parallel data paths. Microcontroller 74 coordinates the data flow of the demultiplexer 70 and multiplexer 72 with the other set-top box circuits 24 in the network.

The demultiplexed data is delivered to various units or ports such as a television, telephone or the like. Communications data is conveyed to a television through a television switch select circuit 76. The switch select circuit 76 selects one of the TV channel outputs from the 100 or so transmitted from the head-end 20 for viewing on the home television monitor. A user selects the channel with conventional television remote control devices. Digital-to-analog converters ("D/A") devices 80 are implemented to provide analog outputs for analog television sets as needed.

The microcontroller 74, shown in FIG. 4, controls the flow of user data from and to its respective residential building 14 in the HAN neighborhood 16 by removing data from the user data segment or segments of the multiplexed data stream addressed to a node station 18 and synchronizing data from the residential building 14 back into the user data stream. A suitable microcontroller is an 80286 microprocessor available from Intel, Inc.

The user data stream is a 62.5 Mega-bits-per-second (Mbps) channel 89, but can be increased to two or three similar channels as the demands of the users increases. The user data bit stream is dynamically allocated by the head-end microcontroller 126. As an example, about 2 Mbps to about 5 Mbps of the data frame can be allocated toward telephone conversations. Specific telephone conversations starting will be allocated to a position in the data frame at the start of the telephone call by the head-end microcontroller 126 and that position in the data frame would remain allocated until that telephone call is terminated. User data would consist of telephony, personal computer data, auxiliary data for home maintenance and control, fire and intrusion alarm, etc. Futuristic home video conferencing equipment allowing total office immersion of stay-at-home workers could be supported. The bandwidth availability can readily accommodate data transmissions common today. For example, telephone service can be accomplished to about 500 homes with less than 3 Mbps. However, bandwidth hungry technologies such as real-time video conferencing, can require throughputs approaching a magnitude of Giga-bits-per-second. An initial allocation of 125 Mbps for the residences in the HAN 10 is sufficient for future bandwidth needs in the near future.

The head-end equipment 20 records in an electronic memory the devices located in each residence or business node 18 to which it is furnishing information to the HAN. Also recorded is the type of specialized service provided to the residence or business nodes 18. FIG. 5 shows a software table of node information that is typical of the information contained in the head-end equipment for system control.

Connected to demultiplexer 70 through receive wire 26 is downlink power amplifier circuit 40. The receive optical detector 38 is connected to the downlink power amplifier circuit 40 through coaxial cable 41. Direct current ("DC") blocking capacitors C decouple the alternating current ("AC") signal path from the DC path such that amplifier 82 and receive optical detector 38 can be individually electrically-biased. The amplifier 82 is sufficiently linear in operation across the operational bandwidth of the system which is initially selected at about 1 GHz. A suitable amplifier is a VNA-25 available from Mini-Circuits. A suitable receive optical detector is a C30616E available from EG&G of Canada. The electrical current generated in the receiver optical detector 38 results in an output voltage across the resistor $R_1$. Resistor $R_1$ also matches the receiver optical detector 38 to the amplifier 82 input impedance. The RF choke 86 reverse biases the receiver optical detector 38.

Connected to the multiplexer 72 through transmit wire 28 is the uplink power amplifier circuit 44. The transmit optical laser 42 is connected to the uplink power amplifier circuit 44 through coaxial cable 45. DC blocking capacitors C decouple the AC signal path from the DC path such that the amplifier 84 and transmit optical laser 42 can be individually biased. Resistor $R_2$ is a matching resistor to raise the impedance of the laser to the amplifier 84 output impedance. The amplifier 84 is sufficiently linear in operation across the operational bandwidth of the system, which is about 1 GHz. A suitable laser is a HL1326MF available from Hitachi. The laser 44 is biased through the RF choke 90. The multiplexed data stream is transformed into an on-off keying ("OOK") modulated optical carrier signal for transmission. The modulated data stream is then converted into light energy through the transmit optical laser 42 into the multiplexed data signal 58.

The multiplexed data signals 58 can contain television, telephone, and computer data. The multiplexed data carrier signals 58 can take other binary waveforms encoded in digital formats such as On-Off-Keying ("OOK"), Frequency-Shift-Keying ("FSK"), Quadrature-Phase-Shift Keying ("QPSK"), or Quadrature-Amplitude-Modulation ("QAM"). OOK format is preferred for the present embodiment due to its relatively low complexity.

Shown in FIG. 4, synchronous telephony and fax data line 40 is provided. Demultiplexer 70 routes the telephony data to the user in the same manner as the video data. If analog phones and faxes are used in the residence, the lines are connected to A/D converter 80 for signal conversion, accordingly. A/D converter 80 has bi-directional conversion capability for digitization of analog signals from analog equipment before the signals are sent to the microcontroller 74 for synchronization with the television data and computer data communications. Data from the user is routed through the microcontroller 74 to the multiplexer 72 for incorporation into the multiplexed data signal 58.

The node station 18 also supports asynchronous data transfers associated with personal computers 36, referring briefly to FIG. 2. The personal computer interface 37 for the HAN can be in asynchronous transfer mode ("ATM"), frame transmission or Ethernet interface or other such formats. An auxiliary interface is available through coaxial cable 31 for a universal and software programmable peripheral options. Such options can include, for example, a fire alert, a security monitoring function, a remote access to home maintenance functions, or medical alert.

Figure 6:
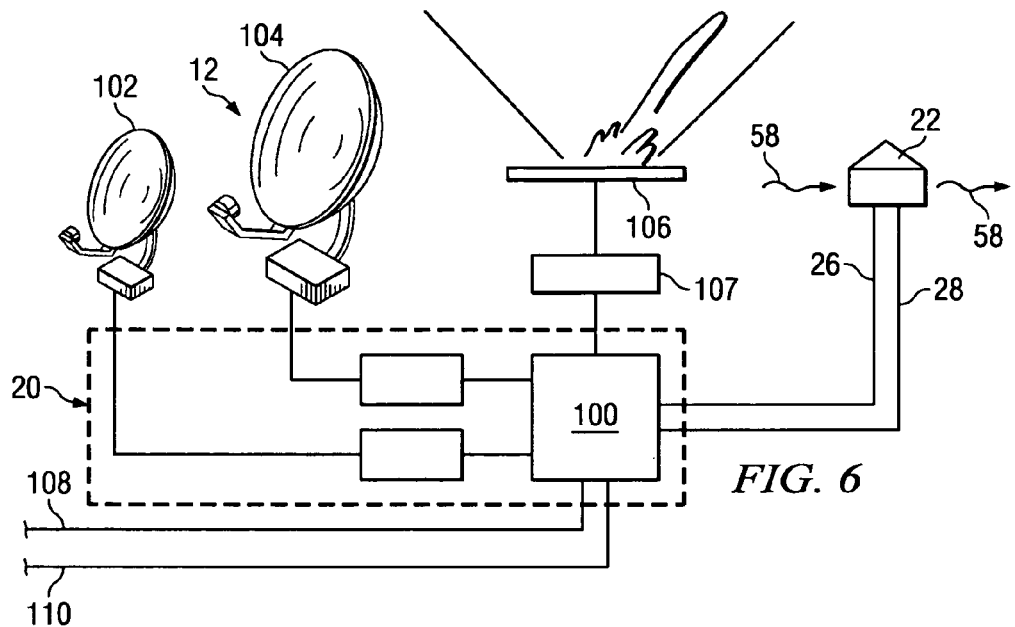
FIG. 6 is an illustration of a head-end communications circuit connected to a plurality of external data communications networks.

Similarly, as stated in previous paragraphs fiber optic path 200 interconnections can replace the interconnections between the set-top box and the roof-top unit. This embodiment removes the electronics bandwidth limitation of the coaxial cable from the HAN 10. This embodiment allows the HAN 10 to be upgraded to higher bi-directional bandwidths with minimal system changes. That is, as multiplexer and demultiplexer integrated circuit technology development continues, the limitation of 1.5 Giga-bits-per-second will be removed. Referring to FIG. 6, a head-end communications circuit 20 is shown. The head-end circuit is the interface between the photonic HAN 10 shown in FIG. 1 and external communications data sources 12 such as local cable, local free space UHF and VHF television transmissions, direct space television, and direct space wide bandwidth data transfer.

The head-end communications circuit 20 has an interface connectable to external communications data sources 12. For example, data is provided by a DBS television dish 102, a S & C Band satellite dish 104, a Ka Band LED Direct Space Communications link antenna 106 which feeds through a terminal box 107, a telephone cable 108 and a cable television cable 110. These sources are routed to the head-end communications circuit 20. The head-end circuit 20 converts these data sources into a high-speed digital data signal. This signal is conveyed through a transmit cable 26 and broadcast from a roof-top unit 22.

Figure 7:
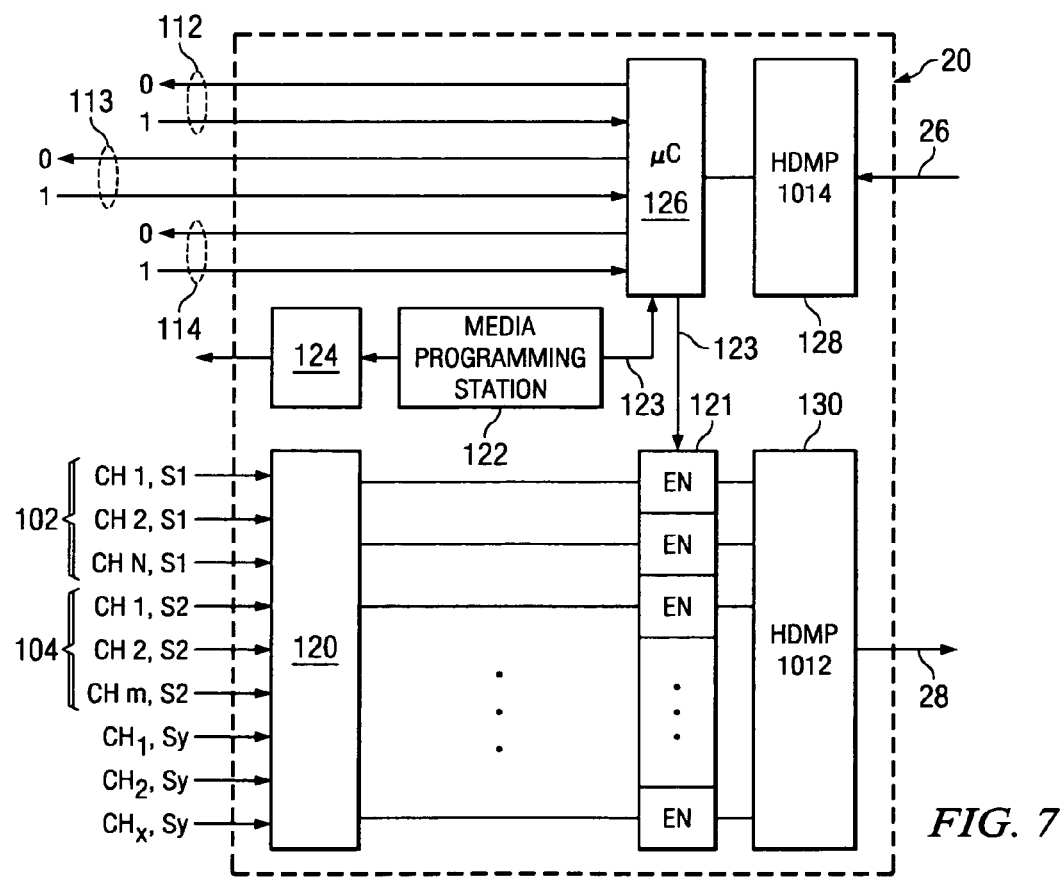
FIG. 7 is an electrical schematic of a head-end communications circuit.

Referring to FIG. 7, shown is the head-end circuit 20 with a signal formatting circuit 120 for formatting the communications data sources into a multiplexed data signal 58. The signal formatting switch 120 takes the digitized television channels from numerous raw sources of single-way television such as DBS television 102 and S&C band satellite television 104 and selects a cross-section of channels and synchronizes their carriers for combination. The channels selected are a result of negotiations with communications service providers and the users of the photonic HAN 10. The synchronization switch 120 includes A/D devices internally where necessary to digitize an analog television channel.

The channel selection register 120 designates the core television channel selection for the photonic HAN. The channel selection register 120 is controlled by a head-end personal computer ("PC") 122 having an executable program. It should be noted that the PC can be provided by commonly-available personal computers, preferably operating at 550 MHz rates. Devoted server systems may also be used to provide the head-end PC. The head-end PC 122 can be programmed on a weekly, monthly or longer basis as needed. Control of the selection register 120 can be dynamic in that a specific program on a specific television network can be allocated at a designated programming time in the register, such as scheduling of "pay-per-view" boxing matches or similar sporting events.

When premium television channels or requested channels are placed on the network the microcontroller 126 creates a digital encoding key and initiates encoding of the channels through digital encoder or enabling register 121. Users verified to view these services that are recorded on the control station 122 and are sent a software key through the user data stream to their residence. Network connections 112, 113 and 114 are interfaces with microcontroller 126 for routing accordingly.

The head-end PC 122 creates and maintains a master program scheduling plan. The scheduling plan tracks premium monthly channel service for monthly billing 124. Special single event programming can be purchased by users through the set-top box 24 with interactive requests by users. These interactive requests are tracked by the head-end PC 122 and billed accordingly. Head-end PC 122 also executes a program which controls the synchronization switch 120 and works interactively with microcontroller 126 via multiple conductors 123 to control premium channel access and special event programming.

An aspect of the photonic HAN 10 is that bi-directional user data is combined with the multiplexed data signal path 58. Referring to FIG. 4, user data is provided to the set-top box circuit 24 through personal computer line 37 and telephone line 35 routed by the microcontroller 74 to multiplexer 72. Multiplexer 72 incorporates digitized voice transmissions and data transmissions from the residential customers into the multiplexed data signal 58. Referring to FIG. 6, the head-end microcontroller 126 synchronizes the user data transmitted to and received from the node stations 18.

The head-end microcontroller 126 program performs node station code field monitoring. That is, node station code monitoring tracks voice and data transmissions originating from users and routes this data to other users or external networks 12 in the HAN 10 as required. Node station codes are allocated as shown in FIG. 5, which illustrates a computer screen display indicating the communications services available to each node in the HAN. The head-end microcontroller 126 separates voice transmissions from data transmissions. The voice transmissions are time sequenced onto a local telephone transmission line 108 of the external communications network 12. The data transmission has an address data format designating whether the data is synchronous or asynchronous. The address data format contains the node station field 140, a device field 141 which indicates the services at a node such as telephone, computer, and the like. A device field 142 contains information regarding particular electronic communications devices at the node. A subroutine field 143 contains peripheral device address information such as telephone numbers and the like. A special-instruction field 144 contains information that is acted upon in the occurrence of certain events. For example, with respect to auxiliary devices listed in the device field 141, if a fire alarm is triggered, then the fire alarm will notify the fire department and designated neighbors. If a burglar alarm is sounded, the police department designated neighbors are notified.

The head-end microcontroller 126 also performs system failure monitoring of all homes on the photonic HAN. A break in the ring network formed by the plurality of node stations 18 is indicated by the loss of the homes or residences preceding the break and the loss of the common carriers in the return link. Therefore, head-end microcontroller 126 can determine which link of potentially several hundred node stations has failed. A software algorithm initiates the microcontroller 126 to notify maintenance personnel accordingly for repair.

Software decoding keys are loaded onto individual set-top box circuits 24 periodically through the multiplexed data path 58 and the set-top box microcontrollers 74, with respect to the device field 141 contents. Decoding keys are randomly generated for security purposes and can be updated periodically so as to preclude unauthorized access to services. For example, the microcontroller 126 encodes premium television channels controls access to special "Pay-Per-View" programs and reports to the head-end PC 122 user purchases of these programs.

As shown in FIG. 7, the head-end microcontroller 126 is connected to the head-end demultiplexer 128 and the head-end multiplexer 130. The demultiplexer 128 decodes the multiplexed data path 58 from the photonic HAN arriving through receive wire 26. The signal contains user data which requires further processing and transmission to the external data communications network 12. The demultiplexer 128 removes the user data stream from the multiplexed data signal 58 while disregarding the real-time television channel portion. The microcontroller 126 processes the extracted user data which is identified by node station code 140 and form of data such as synchronous telephony data, asynchronous user requests or otherwise.

The system discussed in this patent application as it relates to telephony service lends itself to providing its own dial tone service. This will be an option for the purchasing authority.

They can use existing terrestrial service providers, direct space service providers or be their own service provider and purchase backhaul service from one of the above companies. The business relationship will be fluid and subject to regulatory options available to the community.

Figure 8:
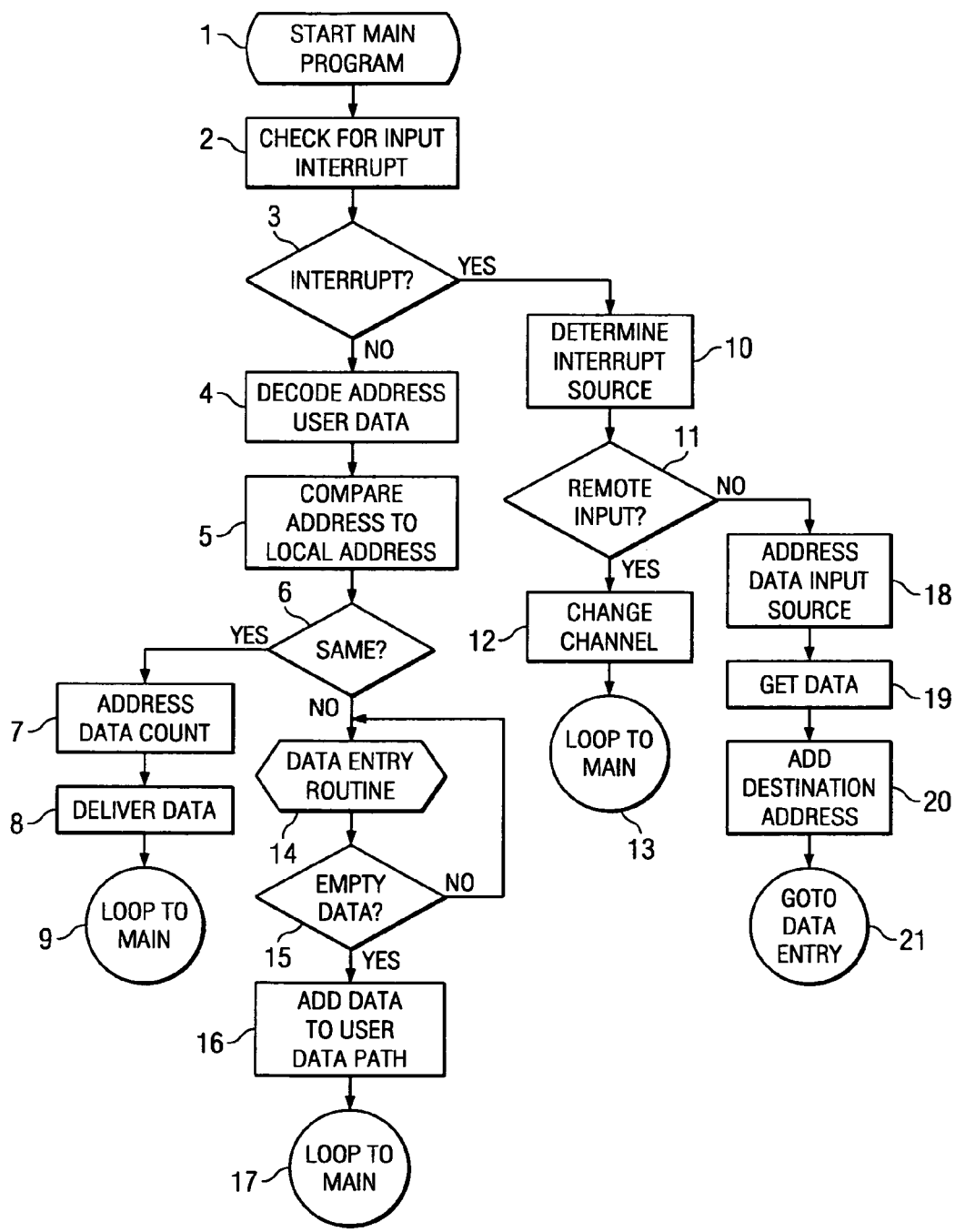
FIG. 8 is a flow chart diagram of a program executed on the head-end communications circuit and the set-top box circuit.

Referring to FIG. 8, a flow chart of the program executed on the set-top box circuit microcontroller 74 and the head-end microcontroller 126 is shown. The program applies to the user data stream having bi-directional data such as telephony or computer data since the video and audio channels 88, shown in FIG. 4, are merely passed through the set-top box circuit 24 and are continuously multiplexed onto the data stream through the head-end circuit 20.

The program begins (step 1) and checks for an input interrupt (step 2). If there is not an input interrupt then the program proceeds to decode the address of the user data (step 4). The decode address user data in the signal is compared to the local address at the node station 18 or the head-end communication circuit, accordingly (step 5). If the two addresses are the same, then the data delivery routine is invoked (step 7). Then the node station is addressed (step 7) and the data is delivered (step 8) and the program returns to the start of the main program (step 9).

If the address in the signal and the local address are not the same (step 6), then the program seeks to acquire user data (step 14) if there is open space in the transmission signal (step 15). If there is no open space, the program returns attempts again to acquire user data (step 14) and continues to do so until a space in the transmission signal opens in which user data is added to the signal (step 16). The program returns to the main program (step 17).

When an interrupt is received (step 3) an interrupt service routine is called (step 10). The source of the interrupt is searched (step 11). If the interrupt source is a hand-held television remote control then the television channel is changed (step 12) and the program returns to the start of the main program (step 9). If the interrupt source is not a hand-held television remote control then the address of the data input source is acquired (step 18). The accompanying data is retrieved (step 19) and the destination address is added to the signal for multiplexing (step 20). The destination address is another node station in the photonic HAN or external network, which allows local telephone communications without the necessity to go outside the HAN to call, for example, a next-door neighbor. The program then returns to the main program (step 21).

Second Embodiment

Redundancy can be designed into the HAN 10 with a bi-directional path. For example, when a node station 18 in the HAN 10 is interrupted, data flow can be re-routed such that each side of the photonic network interruption is self-contained. Hardware redundancy in the set-top box and in the transmit optical laser 42 and the receive optical detector 38 can be installed using the same principles as disclosed above.

Figure 9:
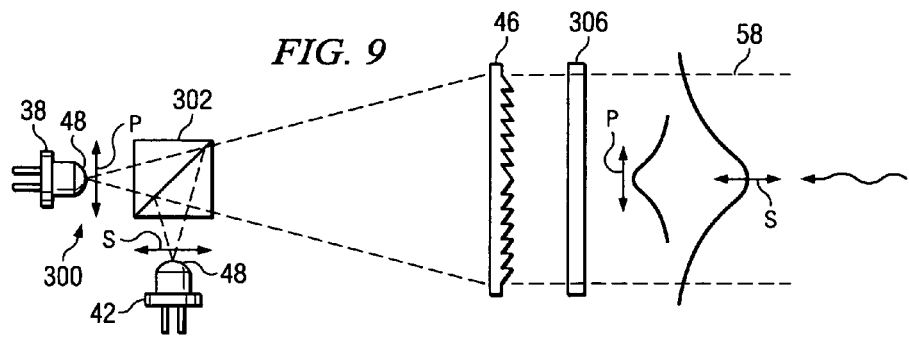
FIG. 9 is a schematic illustration of a second embodiment having a transmission redundancy scheme.

A redundant-path roof-top unit 300 is illustrated in FIG. 9. For clarity, one receive and transmit configuration is shown. Another such configuration is mounted substantially opposite the illustrated unit so that the network ring can be completed. Redundant-path roof-top unit 300 of would require the position of the laser 42 and the detector 38 to be complementary arranged for the laser at one location to optically couple to the detector at the other location and vice versa. If a link or photonic path 58 is blocked, the information can be looped back to the head-end 20 or next roof-top unit 18 (shown in FIG. 1).

The transmit optical laser 42 generates optical radiation from a direct injection, diode heterojunction laser. Such radiation is highly polarized in a direction parallel to the semiconductor junction of the device. This polarization characteristic of the laser 42 allows the addition of a polarization beam splitter 302 to separate and route the incoming and outgoing light or information path of the optical carrier 58. A suitable beam splitter is available from Newport Corporation under the part number 05FC16PB.9 or 10FC16PB.9. For further clarity, the optical carrier 58 is split, or polarized, into a receive wave and a transmit wave. The receive wave is the P-component of the optical carrier 58. The transmit wave is the S-component of the optical carrier 58. The S-component is deviated through a 90-degree angle while the P-component passes undeviated through the beam splitter 302. This opposite polarization does not interfere with the detector nor the optical carrier 58.

Fresnel lens 46 can be used to focus and gather the receive wave A and the transmit wave B, respectively. An optical filter 306 reduces the external random light frequencies injected into the system by ambient light from the sun, street lights or the like. Optical filter 306 preferably has a wavelength cutoff position of about 1000 microns. A suitable optical filter is available from Edmund Scientific Company, New Jersey, under the part number E32,770 or E32,760. Reducing the background radiation generated from these sources makes the system more sensitive.

Further Embodiment

A data cell-based, or packet-based, embodiment of the set-top box, or service node card 400, is provided to take advantage of cell-based information routing. Such a data configuration allows expeditious routing of data in cell formats that can be conducted through the routing devices, such as Field Programmable Gate Arrays ("FPGA") executing firmware routines for expeditious routing of data.

The service node card 400 preferably implements a data cell format that can be provided as through use of Asynchronous Transmission Medium ("ATM") format. An ATM cell is 53 bytes in length, with five bytes allocated for addressing purposes under the field designation ADDR. Generally, one byte may be allocated for checksum purposes, however, this one byte may be used for other informational purposes. The address portion of the cell contains "data type" information that is placed by the head end with respect to the particular node structure of the network.

The ADDR field contains at least two information fields: the VIRTUAL_PATH field, and the VIRTUAL_CHANNEL field. The VIRTUAL_PATH field associates the service node card 400 with its distinct node address 14 with respect to other nodes 14 within the network (see FIG. 1). The VIRTUAL_PATH field allows the head-end communications circuit 20 (see FIG. 6) to communicate with the service node card 400. Further, the VIRTUAL_PATH field permits inter-nodal communication between the nodes 18 of the network 12.

Further, the VIRTUAL_PATH field permits both broadcast data that is not directed towards any one node 14, and specific data, for example, telephonic data communications, intended for a target node.

The VIRTUAL_CHANNEL field corresponds to the communication and data services provided on the service node card 400. Examples of the services associated with the VIRTUAL CHANNEL field are video outputs, audio outputs. The values within the VIRTUAL_CHANNEL field relate to a bi-directional or uni-directional data port VC of the service node card 400. For example, the VIRTUAL CHANNEL field has the following designations:

| VIRTUAL CHANNEL | Port | VIRTUAL CHANNEL | Port |
| --- | --- | --- | --- |
| VC1 | Video Output | VC10 | Dolby Channel 6 |
| VC2 | S-Video Output | VC11 | RCA Video Input 1 |
| VC3 | RCA Video O/P 1 | VC12 | RCA Video Input 2 |
| VC4 | RCA Video O/P 2 | VC13 | S Video Input |
| VC5 | Dolby Channel 1 | VC14 | Telephone Port 1 (Bi-Directional) |
| VC6 | Dolby Channel 2 | VC15 | Telephone Port 2 (Bi-Directional) |
| VC7 | Dolby Channel 3 | VC16 | RS232 Port (Bi-Directional) |
| VC8 | Dolby Channel 4 | VC17 | Ethernet (Bi-Directional) |
| VC9 | Dolby Channel 5 | VC18 | Reserved |

Figure 10:
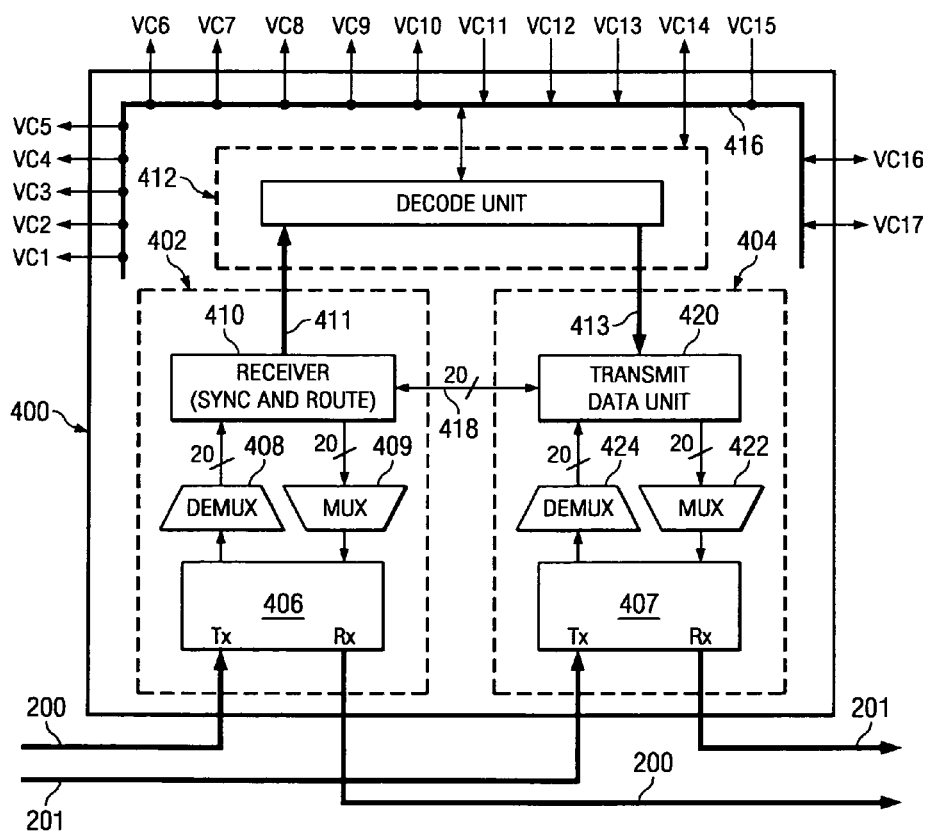
FIG. 10 is a block diagram of a further embodiment of a node card for an area network of the present invention.

Referring to FIG. 10, the service node card 400 has a data distributor circuit 402 and an insertion, or re-incorporator, circuit 404 coupled to a data port 200 through transceivers 406 and 407.

The data distributor circuit 402 has a demultiplexer or deserializer 408 coupled to a an electrical output of the transceiver 406. The deserializer 408 changes the serial output from the transceiver 406 into a parallel data stream representing the same information for input to the receiver 410.

As shown in FIG. 10, the parallel data stream has a size of 20 bits, which is preferably clocked at a 50 MHz or greater data rate. The 20-bit data block has a 16-bit data word with four bits for overhead to mark the start of a cell. The 20-bit data block goes to the receiver 410. The receiver 410 then strips the 16-bit data word and address bits associated with the overhead portion of the data cell, when applicable. As stated earlier, an ATM data transmission has a 53-byte data cell, with five bytes allocated for address data.

With the data cell, the receiver 410 determines whether the data cell is intended for the service card node 400 with the a relational code that identifies that card in the network community. The "relational code" relates to the data value of the VIRTUAL_PATH field. If the contents of the VIRTUAL_PATH field provides a true result when compared with the "relational code" of the service node card 400, then the cell is conveyed to the decode unit 412 via the data communications path 411.

At this juncture, an empty data cell is provided, which is flagged as such to indicate that outgoing data can be provided by the re-incorporator circuit 404, as is discussed in detail below.

At the decode unit 412, the VIRTUAL_CHANNEL field is accessed to determine the media service that corresponds to the 48-byte data field provided by the ATM cell format. For example, if the VIRTUAL_CHANNEL contains a value for VC1, then the data is conveyed to the address for video output VC1. The output data is conveyed through a data bus 416 that allows access between the decode unit 412 and the target peripheral device VC1 through VC17 in the present embodiment.

With respect to bi-directional data flow, such as with POTS ("Plain Old Telephone System") communications, the service node card 400 provides insertion or re-incorporation of data into the data stream 200 and 201 accessed through the Tx and Rx data ports of the transceivers 406 and 407, respectively.

For example, the telephone port VC15 provides bi-directional data that needs to be transported past the service node card 400. The interpretation circuitry and firmware converts the voice data into the data-cell format, which is then communicated to the decode unit 412 through the data bus 416.

As discussed above, when a data-cell is conveyed to the decode unit 412, the data distribution circuit 402 sets a flag indicating that an empty cell is available for insertion into the data stream. According to the example, the re-incorporation circuit 404 inserts the voice data from the telephone source VC15 into the empty cell, which is then re-incorporated into the data stream.

It should be noted that the re-insertion or re-incorporation of the data may be provided by either the data distribution circuit 402 or the re-incorporator circuit 404 via the receiver/transmit data path 418, depending on the circuit having an empty data cell.

As shown in FIG. 10, the re-incorporator circuit has a transmit data unit 420. The transmit data unit 420 conveys the cell data to the serializer 422, which converts the parallel data stream into a representative serial data stream. The output is conveyed to the transceiver 407, which converts the electric data into a photonic representation.

For redundancy purposes, either the data distributor circuit 410 or the re-incorporator circuit 420 can maintain communication services in the event either the data stream path 200 or 201 are severed or disrupted. Accordingly, the transmit data unit 420 is electrically-coupled to a deserializer 424, which is coupled to the second data path 201 through the transceiver 407.

The receiver 410, the transmit data unit 420, and the decode unit 412 are preferably a Field Programmable Gate Array ("FPGA"). An example of a suitable FPGA is provided by Xilinx, of San Jose, Calif., under the Spartan 40 K gate devices. Suitable optic transceivers 406 and 407 are available from Hewlett Packard, of Palo Alto, Calif., under the part number HFBR-5305. A suitable deserializer is also provided by Hewlett Packard under the part number HDMP 1022, and a suitable serializer is provided under the part number HDMP 1024.

Note that the communication level between the data distributor circuit 402, the re-incorporator circuit 404, and the decode unit 412, are at a common communications level. In the present embodiment, the common communications level is a data cell structure provided under the ATM protocol. In this manner, efficient routing of data is provided up to the point it is available for translation to the appropriate peripheral device, whether it be audio, video, or computer data information.

Accordingly, these components could be integrated into an Application-Specific Integrated Circuit ("ASIC"), with an interface card engaging the peripheral devices for translation from ATM communications format to the specific format for the device. Typically, such add on devices would incorporate UTOPIA protocol, which is an ATM translation program, for providing the data for the interpretation software and hardware associated with the device. Such translation techniques are known to those skilled in the art, and accordingly, are not discussed here n further detail.

The service node card 400 improves network flexibility and scalability. The service node card 400 allows service providers to improve the flexibility and the ability to expand their service networks without the long lead times and large initial capital investment presently required for a network build-out.

Also, the service node card 400 facilitates the introduction of new data services and creates revenue opportunities for service providers. The flexible system architecture of the service node card 400 allows rapid introduction of new features as add-ons, which can in turn be offered as new services by service providers to customers.

Further, the service node card 400 protects existing capital investments. The service node card 400 allows service providers to increase the functionality and improve the performance of their data networks without sacrificing their existing infrastructure investments, for example, such as use with existing SONET/SDH equipment.

The embodiments shown and described above is only exemplary. Many details which are omitted are well known in the art such as descriptions of the inner workings of multiplexers, demultiplexers, laser transmitters and detectors, and the like. Therefore, many such details are neither shown or described. It is not claimed that all the details, parts, elements, or steps described and shown were invented herein. Even though numerous characteristics and advantages of the present inventions have been set forth in the foregoing description, together with the details of the structure and function of the invention, the disclosure is illustrative only, and changes may be made in the detail, especially in the matters of shape, size, and arrangement of the parts within the principles of the inventions to the full extent indicated by the broad general meaning of the terms used in the attached claims. The restrictive description and drawings of the specific examples do not point out what an infringement of this patent would be, but are to provide at least one explanation how to make and use the inventions. The limits of the inventions and the bounds of the patent protection are measured by and defined by the following claims.

What is claimed is:

1. A method, comprising:
   routing data bandwidth segments on a multiplexed data signal path to a plurality of peripheral devices operably coupled to a set-top box;
   accumulating the data bandwidth segments and routing the accumulated data bandwidth segments on the multiplexed data signal path to the plurality of peripheral devices; and
   forwarding a multiplexed set of the data bandwidth segments addressed to subsequent set-top boxes.

2. The method of claim 1 comprising forwarding information from the plurality of peripheral devices and the data bandwidth segments addressed to subsequent set-top boxes.

3. The method of claim 1 comprising designating video and audio data.

4. The method of claim 3 comprising converting a multiplexed signal into the data bandwidth segments.

5. The method of claim 4 comprising combining the video and audio data into the multiplexed signal.

6. The method of claim 5 comprising combining a plurality of user data with the video and audio data into the multiplexed signal.

7. The method of claim 1 comprising dropping the data bandwidth segments.

8. The method of claim 1 comprising forwarding the data bandwidth segments.

9. The method of claim 1 comprising receiving and dropping the data bandwidth segments.

10. The method of claim 1 comprising receiving and forwarding the data bandwidth segments.

11. The method of claim 1 comprising looping back the data bandwidth segments.

12. The method of claim 1 comprising passing through the data bandwidth segments.

* * * * *